Oct. 14, 1947.  A. L. LEE  2,429,163
HYDRAULIC BRAKE MECHANISM
Filed June 30, 1944  2 Sheets-Sheet 1
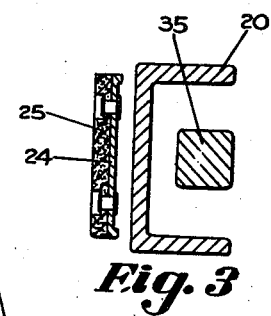
Fig. 3
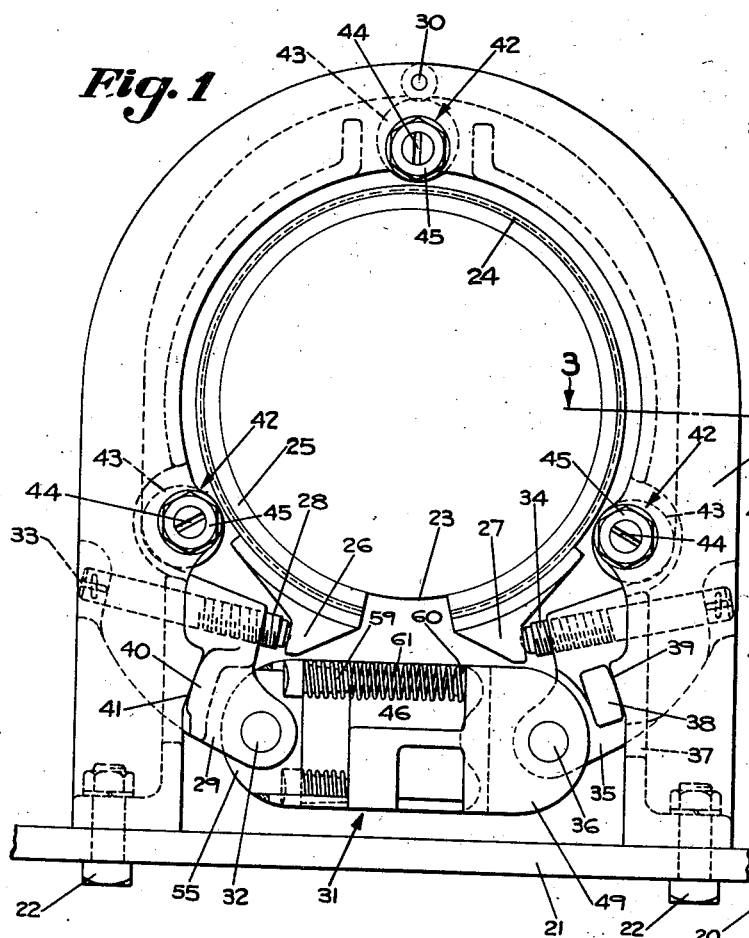
Fig. 1
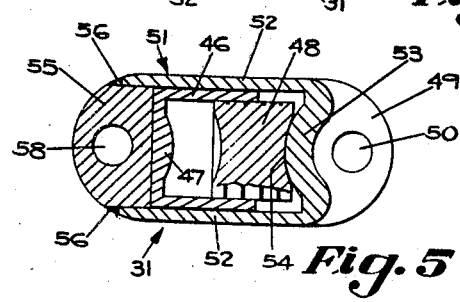
Fig. 4
Fig. 5
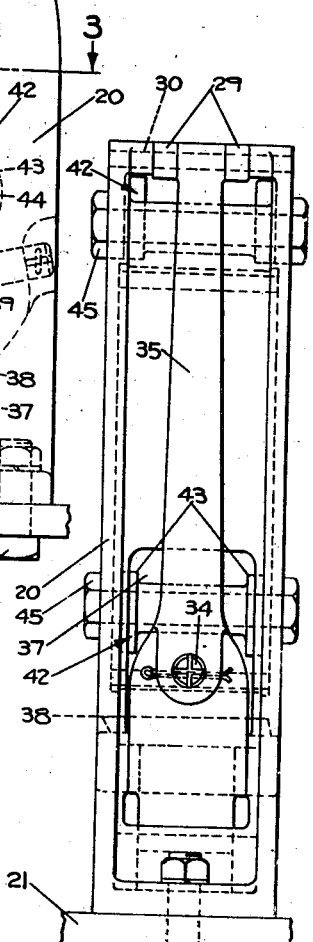
Fig. 2
INVENTOR:
ARTHUR L. LEE,
BY
Harker H. Nittson
ATT'Y.

Oct. 14, 1947.   A. L. LEE   2,429,163
HYDRAULIC BRAKE MECHANISM
Filed June 30, 1944   2 Sheets-Sheet 2
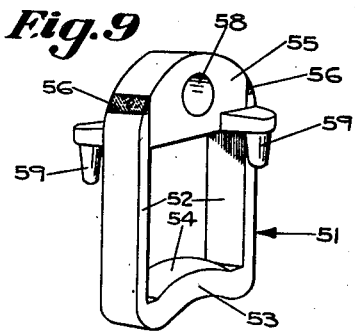
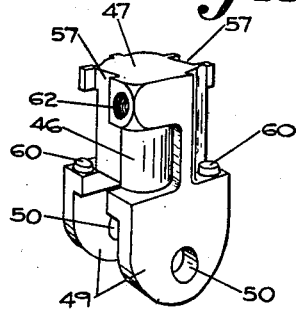
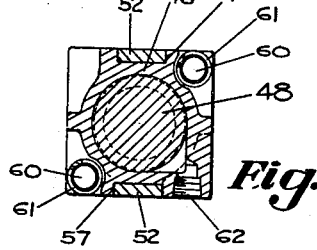
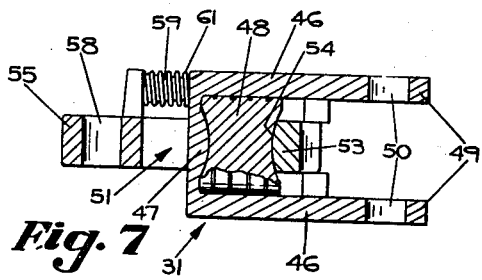
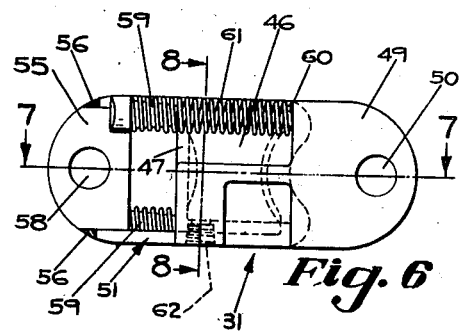
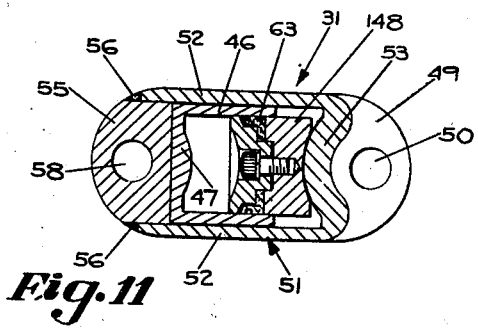
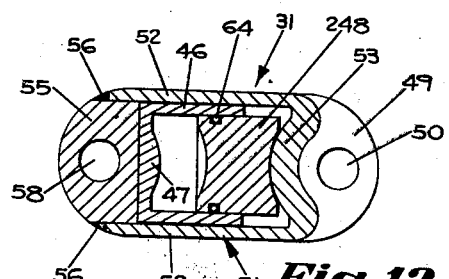
INVENTOR;
ARTHUR L. LEE,
BY
ATT'Y.

Patented Oct. 14, 1947

2,429,163

UNITED STATES PATENT OFFICE 2,429,163

HYDRAULIC BRAKE MECHANISM

Arthur L. Lee, Upper Arlington, Ohio, assignor, by mesne assignments, to The Jeffrey Manufacturing Company, a corporation of Ohio Application June 30, 1944, Serial No. 542,914

5 Claims. (Cl. 188—151)

This invention relates to a brake mechanism and to an actuator, or a motor for actuating brakes or similar mechanisms.

An object of the invention is to provide improved brake mechanism preferably of the self-energizing type and one which is full floating.

Another object of the invention is to provide a hydraulic piston motor or actuator which may be employed to actuate a brake or other mechanism.

A further object of the invention is to provide a brake mechanism including a hydraulic actuator fluid motor which contracts upon actuation.

Still another object of the invention is to provide a brake mechanism including an actuator as well as an actuator per se which is of extremely simple construction and which may be readily replaced as a complete unit.

Other objects of the invention will appear hereinafter the novel features and combinations being set forth in the appended claims.

In the accompanying drawings,

Fig. 1 is a side elevational view of a brake mechanism including features of my invention;

Fig. 2 is an end elevational view of the apparatus of Fig. 1;

Fig. 3 is a sectional view taken on the line 3—3 of Fig. 1, looking in the direction of the arrows;

Fig. 4 is a sectional view through the hydraulic motor or actuator when it is in its normal or open position;

Fig. 5 is a view similar to Fig. 4 with a motor or actuator in its actuated, operated or contracted position;

Fig. 6 is a side elevational view of the motor or actuator per se which comprises as a unit and alone a feature of my invention, the motor being illustrated in the normal, open or non-actuated position;

Fig. 7 is a longitudinal sectional view taken on the line 7—7 of Fig. 6, looking in the direction of the arrows;

Fig. 8 is a transverse sectional view taken on the line 8—8 of Fig. 6, looking in the direction of the arrows;

Fig. 9 is a perspective view of one part of the hydraulic actuator or motor;

Fig. 10 is a perspective view of another part of the motor or actuator; and

Figs. 11 and 12 are sectional views of two modified forms of motors or actuators illustrated in their contracted, actuated or operating positions.

Referring first to Figs. 1, 2 and 3 of the drawings, as illustrated, the brake mechanism constitutes one aspect of my invention. Said mechanism includes a U-shaped yoke or frame member 20 which, itself, is of generally U-shaped structure as viewed in cross-section, as clearly illustrated in Fig. 3 of the drawings. The free ends or bottom of the yoke 20 are connected to a frame or supporting member 21 by spaced bolts 22 which extend through cross webs formed adjacent said free ends of said yoke 20.

Within the yoke 20 is a brake drum 23 upon which there floats a brake band 24 provided with brake lining material 25. The brake band and lining 24 and 25 float freely on the drum 23 and preferably extend over the periphery thereof through an angle only slightly less than 360 degrees and preferably in excess of 270 degrees so that it will have a self-energizing action as hereinafter pointed out more completely.

The spring of the brake band 24 is such that whenever said brake band is released it tends to release the drum 23 for free movement. The free ends of the brake band 24 carry abutments or shoes 26 and 27 each having an abutting connection as hereinafter described. Cooperating with the shoe 26 is an adjustable abutment screw 28 which is threaded through a block formed in the lower end of a pivoted arm 29, the upper end of which is pivotally connected to the top of the yoke 20 by a pivot pin 30 and the bottom of which is pivotally connected to a hydraulic piston motor or actuator 31 by a pivot pin 32. The abutting or inner end of the abutment screw 28 is preferably rounded and extends into a depression in the shoe 26, thus providing a loose but abutting connection between the abutting head of said screw 28 and said shoe 26. The outer end of the screw 28 is provided with a screw driver slot 33 to provide for ready turning and consequent adjustment thereof. A cotter key is preferably provided which extends through the arm 29 and locks the screw 28 in any adjusted position.

Having an abutting connection with shoe 27 is an abutment screw 34 which is identical in structure with screw 28 and is supported in a block formed in the lower end of an arm 35 similar to arm 29, in that the top thereof is pivoted by the pin 30 and the bottom is pivoted by a pin 36 to the opposite end of the piston motor or actuator 31. The relation between the abutment screw 34 and associated shoe 27 is the same as that described for screw 28 and shoe 26. The lower end of the arm 35 extends through an opening 37 (see Fig. 2) in the bottom portion of the yoke 20 in order to reach motor 31. Outward movement of the lower end of the arm 35 is limited by a cross head abutment 38 which extends from opposite sides thereof and cooperates with abutments 39 on the yoke 20. The arm 29 extends through an opening in the yoke 20 similar to opening 37 and cooperating abutment means 40 and 41 are formed on the arm 29 and yoke 20 to restrict the outward movement of the lower end of said arm 29.

Before describing in detail the structure of the piston motor or actuator 31 which per se and also in combination forms an important feature of my invention, it may be stated that said piston motor or actuator 31 is normally in the expanded position, as illustrated in Fig. 1 of the drawings. Under these conditions, the lower ends of the arms 29 and 35 will be swung outwardly to their extreme positions with abutments 38 and 39 in contact and abutments 40 and 41 in contact. This relation of parts is because of the structure of the piston motor or actuator 31, as hereinafter described. With the parts in this position the brake band 24 will be released since the screws 28 and 34 will be adjusted with relation to their shoes 26 and 27 respectively, so as to effect such releasing, under the conditions described and illustrated in Fig. 1 of the drawings. The brake drum 23 will therefore be free to turn with the brake band 24 and lining 25 floating thereon, that is, the brake band 24 and 25 have no connection to any other apparatus except the abutting connections provided between shoes 26 and 27 and screws 28 and 34, respectively, and the floating relation of the brake lining 25 on said drum 23.

Adjustment of the maximum expansion of the brake band 24 is provided by three eccentric brake adjusting devices 42 which are carried by the yoke 20 and equally spaced about the periphery of the drum 23, preferably being located 120 degrees apart. Each of these eccentric brake adjusting devices 42 is merely a bolt mounted for rotation on its axis in the yoke 20 and provided with a pair of spaced eccentrics or cams 43 the effective distances of which from the brake band 24 may be adjusted by rotating the bolt as provided by a screw driver slot 44. A locking nut 45 is provided to lock each adjusting device 42 in any adjusted position.

Attention is now directed particularly to Figs. 4, 5, 6, 7, 8, 9 and 10, and to the detailed construction of the hydraulic piston motor or actuator 31. Said piston motor or actuator 31 is of the fluid actuated type and preferably is actuated by a liquid such as hydraulic oil. One of the outstanding characteristics of said motor or actuator is the fact that upon operation or actuation it contracts rather than expands and consequently it may be directly connected to any mechanism where it is desired to shorten the distance between two points upon actuation of the device. A brake is one illustration of such a mechanism and obviously there are others. For example, the actuator might be employed to swing the rudder of a boat or airplane or to control other parts thereof or of any other wide variety of devices. In other words, the actuator per se will have a great many uses in addition to the specific use illustrated and consequently in one aspect of the invention the actuator alone constitutes an important feature thereof.

Said motor or actuator 31 includes a body member in the form of cylinder 46 which is closed at one end by a closure member 47. The other end of the cylinder 46 or the right hand end, as viewed in Figs. 4, 5, 6 and 7 of the drawings, is open so that a piston 48, preferably provided with peripheral oil and grit grooves, may slide into the cylinder 46 and have a close fit between the external cylindrical surface of the piston 48 and the interior cylindrical surface of the cylinder 46. At the right hand end or, in other words, adjacent its open end, the body or cylinder 46 is provided with a connecting bifurcated head 49 which is in the form of two spaced apart members which head provides for pivotal connection with some member to be actuated such as the brake arm 35, the spaced members of said head 49 being provided with aligned pivot pin receiving holes or openings 50 to receive the pivot pin 36. Obviously the head 49 provides a connecting member by which one end of the piston motor or actuator 31 may be pivotally connected to any device which is to be actuated or operated.

Looped about the cylinder 46 and the piston 48 is a loop formed by a U-shaped yoke 51, which yoke 51 is formed of a pair of parallel side bars or straps 52 interconnected at one end by a crosspiece or cross-bar 53 which forms a base of said U-shaped yoke 51. Said base, cross-piece or cross-bar 53 preferably has a bearing area 54 which is a segment of a sphere though any desired shape may be employed which provides an extended bearing area of contact with the right hand, rear or bottom portion of the piston 48 which is of complementary structure. Thus the piston 48 and yoke 51 have only an abutting one-way connection between them, that is, piston 48 can move the yoke 51 to the right relatively, as seen in Figs. 1, 4, 5, 6 and 7 of the drawings, or the yoke 51 can move the piston 48 to the left relatively, as seen in said figures of the drawings, but reverse relative motion cannot be positively effected.

The yoke 51 is provided with a rigidly attached head or cap 55 which is preferably permanently attached to said yoke as a final act of assembly of the parts by welding the free ends of the side bars or straps 52 thereto, as illustrated by the welds 56. It is the intention of the inventor that the piston motor or actuator 31 when damaged or worn out shall be replaced as a complete unit and it is for this reason that the head or cap 55 is welded to the yoke 51. If it is desired to make the unit so that it can be disassembled, the yoke 51 may be attached to the head or cap 56 by screws or the like. It will be noted, particularly by reference to Figs. 8 and 10 of the drawings, that the external configuration of the cylinder 46 is such as to provide guideways 57 for the side bars 52 of the yoke 51 which provide forward axial or longitudinal movement between the yoke 51 and the cylinder 46. The cap or head 55 is provided with a hole or opening 58 which provides for its pivotal connection to a mechanism to be operated, which in the illustration of my invention is the arm 29, the pivotal connection being provided by pin 32.

In its normal condition the piston motor or actuator 31 is fully expanded and this normal expansion is provided by a pair of frustoconical projections 59 formed on opposite sides of the head or cap 55, the axes of which are parallel with the axis of the cylinder 46 and piston 48.

As clearly illustrated in Figs. 1 and 6 of the drawings, these projections 59 align with bosses 60 formed on the head or base 49 of cylinder 46. Helical compression springs 61 extend between the projections 59 and the bosses 60 and abut the bases of each of them, thus urging the heads 49 and 55 apart, that is, urging the hydraulic piston motor or actuator 31 to the fully expanded position or, in other words, to its normal or open position, as illustrated in Figs. 1, 4, 6 and 7 of the drawings.

To provide for actuation and contraction of the hydraulic piston motor or actuator 31 there is a threaded feed opening 62 (see Figs. 8 and 10) provided adjacent the closed end of the cylinder 46 by which the hydraulic fluid such as oil is delivered to the interior of said cylinder 46 and between the closed end 47 and piston 48. Obviously the introduction of hydraulic fluid under pressure through the feed opening 62 will cause relative movement between the cylinder 46 and piston 48 which, due to the mechanical linkage above described, will cause rectilinear movement of the two heads 49 and 55 toward each other. The limits of this rectilinear movement are indicated by comparing Figs. 4 and 5 of the drawings.

From the above description it is obvious that the piston motor or actuator 31 is a very compact device. The parts are simple and rugged. It is direct acting and contracts upon actuation. It may be noted that the pin receiving holes 50 and 58 lie in a plane or along an axis passing through the center or axis of the cylinder 46 and piston 48. As a consequence there is no turning movement which requires compensation but true rectilinear motion is produced along the axis of the actuator as a unit. In view of the simple and inexpensive construction of the actuator it is contemplated that in any case where parts become excessively worn, the actuator will be replaced as a complete new unit. However, as above mentioned, by making the cap or head 55 removable, it may be disassembled and repaired and I contemplate such a structure within the broad scope of my invention.

In Fig. 11 of the drawings I have shown a modification of the actuator, the modified structure being confined to the piston 148 which is essentially a two-part device provided with well known type of packing 63 to insure a fluidtight fit between the piston 148 and the cylinder 46.

In Fig. 12 of the drawings I have shown another modified form of piston 248 in which there is provided a circumferential groove which receives a rubber sealing ring 64 which, as well understood in the hydraulic art, provides a fluidtight packing between the piston 248 and the cylinder 46. Except for the differences illustrated, the piston motors or actuators of Figs. 11 and 12 follow the structure previously described.

To review briefly the operation of the apparatus in its complete form as illustrated in Fig. 1 of the drawings, the brake band 24 and lining 25 float freely on a brake drum 23. The spring action of the brake band 24 is such that it tends to expand to a larger cylinder than the drum 23 and thus release itself. The pivotally connected arms 29 and 35 when actuated by the piston motor or actuator 31 swing about the pivot pin 30 and through the abutting connection provided by screws 28 and 34 and abutments 26 and 27, respectively, contract the brake band 24 to apply the braking action. The brake is not only full floating but is of the self-energizing type for each direction of rotation of the drum 23, that is, as the brake band 24 is contracted the rotation of the drum 23 will aid in the braking action since friction between it and the brake lining 25 will tend to increase said braking action. This is due particularly to the fact that the brake band is full floating and is continuous between the point of contact of one shoe, such as shoe 26, to the other shoe, such as shoe 27, and the brake band extends through a large portion of the circumference of the drum 23, and is preferably extended over 270 degrees thereof.

Referring more in detail to Fig. 1, it is to be noted that the arms or levers 29 and 35 are pivoted to the pin 30 which is positioned above the upper or central eccentric brake band adjusting or positioning device 43. The eccentric devices 43 are adjusted so that the central axes of the brake drum 23 and the brake band 24 are coincident when the brake is released, that is, when the brake band is expanded against all of the eccentric adjusting or positioning devices 43. Because of the particular positioning of the pivot pin 30 upon which the arms or levers are pivoted, the levers when moved toward one another cause the abutments of the screws 28 and 34 to swing in long arcs which very gradually approach the brake drum, thus when the levers 29 and 35 are moved toward one another the heel and toe respectively of the brake band also travel in arcuate paths which correspond to the paths of travel of the abutment screws 28 and 34. This particular construction and arrangement of the levers 29 and 35 and the brake band 24 causes the brake band to be drawn uniformly about the brake drum and to float thereon before any braking pressure is applied upon the brake band, that is, the toe and heel of the band are not permitted to drag upon the brake drum while the brake band is being contracted about the drum prior to the application of braking pressure thereto, but when braking pressure is applied the toe and heel of the band act upon the drum. In other words, the axis of the brake band is at all times maintained substantially coincident with the axis of the brake drum. The brake band remains circular and is contracted in such manner that substantially all of the frictional area contacts the brake drum substantially simultaneously and then braking force is applied to it.

With this construction and arrangement of the levers and full floating brake band the levers 29 and 35 form the sole anti-rotational anchoring means for the brake band when it is contracted upon the brake drum and the brake is full self-energizing for either direction of rotation of the brake drum, that is, the brake drum tends to wind the entire brake band about itself which increases the braking effect and tends to reduce the pressure required to move the levers 29 and 35 toward one another because the abutment on the toe or leading edge of the brake band is pulled against the abutment screw 28 or 34 and this force is transmitted through the lever 29 or 35 to the frame 20 through the pivot pin 30.

It is to be particularly noted that the actuator 31 has its heads 49 and 55 directly and pivotally connected to the free ends of the brake actuating arms 29 and 35 and that upon the application of hydraulic fluid to the piston motor or actuator 31 the overall length thereof decreases, or, in other words it contracts, in response to actuation or application of hydraulic fluid pressure. In short, the actuator has its heads directly connected to the two members, namely arms 29 and 35, which are to be pulled toward each other. This obviously makes for a very simple, direct acting positive type of piston motor or actuator and eliminates the necessity of the usual reversing linkages found in expanding types of brake mechanisms or other actuating devices.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention, what I desire to secure by Letters Patent of the United States is:

1. A self-energizing brake mechanism including a brake drum, a one piece brake band freely floating on said drum and extending over the periphery thereof in excess of 270 degrees, abutments on the free ends of said brake band, spaced eccentric means having only an abutting contact with said band for adjusting it toward and from said drum, and operating mechanism having abutting connection only with said abutments and adapted to exert pressure on them and contract said brake band on said drum while maintaining the axes of said brake band and drum substantially coincident thereby contracting said brake band uniformly whereby all of the frictional area thereof is brought substantially simultaneously into contact with the brake drum and thereafter to exert pressure upon said abutments to contract said brake band to apply braking pressure.

2. A reversible balanced self-energizing brake mechanism including in combination a frame, at least three spaced adjustable eccentric brake band positioning members carried by said frame, a brake drum adapted to rotate in said frame, a one piece brake band adapted to float upon said drum extending over the periphery thereof in excess of 270 degrees, said brake band being normally expanded away from said drum and against said spaced eccentric brake band positioning members when said brake mechanism is inoperative, abutment means secured to opposite ends of said brake band, said ends and abutments being positioned between a pair of said adjustable eccentric brake band positioning members, a pair of levers pivoted to said frame opposite said abutment members, adjustable means abuttingly connecting the free end of each of said levers with the adjacent abutment means, stop means carried by each of said levers adapted to cooperate with said frame for limiting expansive swinging movement of said levers, and a floating operating mechanism connecting the free ends of said levers including an expansible fluid pressure cylinder and piston, and lever operating heads cross-connected to said cylinder and piston whereby as said cylinder and piston expand said operating heads contract to draw said levers and abutments together and contract said brake band on said drum, said levers maintaining the axes of said brake band and drum substantially coincident thereby contracting said brake band uniformly whereby all of the frictional area thereof is brought substantially simultaneously into contact with the drum and thereafter to exert pressure upon said abutments to contract said brake band to apply braking pressure.

3. A reversible balanced self-energizing brake mechanism including in combination a frame, spaced adjustable brake band positioning members carried by said frame, a brake drum adapted to rotate in said frame, a one piece brake band adapted to float upon said drum extending over the periphery thereof in excess of 270 degrees, said brake band being normally expanded away from said drum and against said spaced brake band positioning members when said brake mechanism is inoperative, abutment means secured to opposite ends of said brake band, said ends and abutments being positioned between a pair of said adjustable brake band positioning members, a pair of levers pivoted to said frame opposite said abutment members, adjustable means abuttingly connecting the free end of each of said levers with the adjacent abutment means, and a floating operating mechanism connecting the free ends of said levers including an expansible fluid pressure cylinder and piston, and lever operating heads cross-connected to said cylinder and piston whereby as said cylinder and piston expand said operating heads contract to draw said levers and abutments together and contract said brake band on said drum, said levers maintaining the axes of said brake band and drum substantially coincident thereby contracting said brake band uniformly whereby all of the frictional area thereof is brought substantially simultaneously into contact with the drum and thereafter to exert pressure upon said abutments to contract said brake band to apply braking pressure.

4. A reversible balanced self-energizing brake mechanism including in combination spaced brake band positioning means, a brake drum, a one piece brake band adapted to float upon said drum extending over the periphery thereof in excess of 270 degrees, said brake band being normally expanded away from said drum and against said brake band positioning means when said brake mechanism is inoperative, abutment means on opposite ends of said brake band, a pair of levers each pivoted substantially centrally of the length of said brake band outside the confines thereof, adjustable means abuttingly connecting the free end of each of said levers with the adjacent abutment means, and a floating operating mechanism connecting the free ends of said levers including an expansible fluid pressure cylinder and piston, and lever operating heads cross-connected to said cylinder and piston whereby as said cylinder and piston expand said operating heads contract to draw said levers and abutments together and contract said brake band on said drum, said levers maintaining the axes of said brake band and drum substantially coincident thereby contracting said brake band uniformly whereby all of the frictional area thereof is brought substantially simultaneously into contact with the drum and thereafter to exert pressure upon said abutments to contract said brake band to apply braking pressure.

5. A fluid actuator structure including a body member forming a cylinder having an open and a closed end, part of said body member forming a bifurcated head adjacent the open end of said cylinder which head is adapted to be connected to a member to be operated, said body member having oppositely disposed spaced guide means extending along its sides, a piston in said cylinder, a yoke extending through the bifurcation in said head abutting said piston, the sides thereof operating in said oppositely disposed spaced guide means, a head adapted to be connected to another member to be operated connecting the ends of said yoke adjacent the closed end of said cylinder, each of said heads having oppositely disposed aligned bosses, and spring means interposed between said aligned bosses urging said heads apart whereby upon movement of said piston toward the open end of said cylinder said two heads will be moved toward each other.

ARTHUR L. LEE.

REFERENCES CITED

The following references are of record in the file of this patent:

UNITED STATES PATENTS

| Number | Name | Date |
|---|---|---|
| 2,175,431 | Ericson | Oct. 10, 1939 |
| 2,182,262 | Pierce et al. | Dec. 5, 1939 |
| 1,249,143 | Loughead | Dec. 4, 1917 |
| 1,460,163 | Loughead | June 26, 1923 |
| 1,696,985 | Trbojevich | Jan. 1, 1929 |
| 1,712,316 | Trebert | May 7, 1929 |
| 1,694,503 | Floraday | Dec. 11, 1928 |
| 2,034,538 | Schnell | Mar. 17, 1936 |
| 1,620,115 | MacKenzie | Mar. 8, 1927 |
| 2,336,841 | Brimble | Dec. 14, 1943 |
| 1,034,579 | Brush | Aug. 6, 1912 |
| 1,444,317 | Lee | Feb. 6, 1923 |
| 2,182,386 | Patterson | Dec. 5, 1939 |
| 1,279,778 | Steen | Sept. 24, 1918 |